July 9, 1940.   H. T. SEELEY   2,207,556

METHOD AND APPARATUS FOR CONTROLLING SYNCHRONOUS MACHINES

Filed Aug. 18, 1938

Inventor:
Harold T. Seeley,
by Harry E. Dunham
His Attorney.

Patented July 9, 1940

2,207,556

UNITED STATES PATENT OFFICE 2,207,556

METHOD AND APPARATUS FOR CONTROLLING SYNCHRONOUS MACHINES

Harold T. Seeley, Lansdowne, Pa., assignor to General Electric Company, a corporation of New York Application August 18, 1938, Serial No. 225,609

4 Claims. (Cl. 171—118)

My invention relates to a method and apparatus for controlling synchronous machines and particularly to a method and an arrangement of apparatus for varying the primary connections of a synchronous machine. One object of my invention is to provide an improved method and an improved arrangement of apparatus for effecting the transfer from the reduced voltage starting to the full voltage running primary connections of a synchronous machine without producing any substantial disturbances in the electrical condition of the supply circuit.

Figure 1:
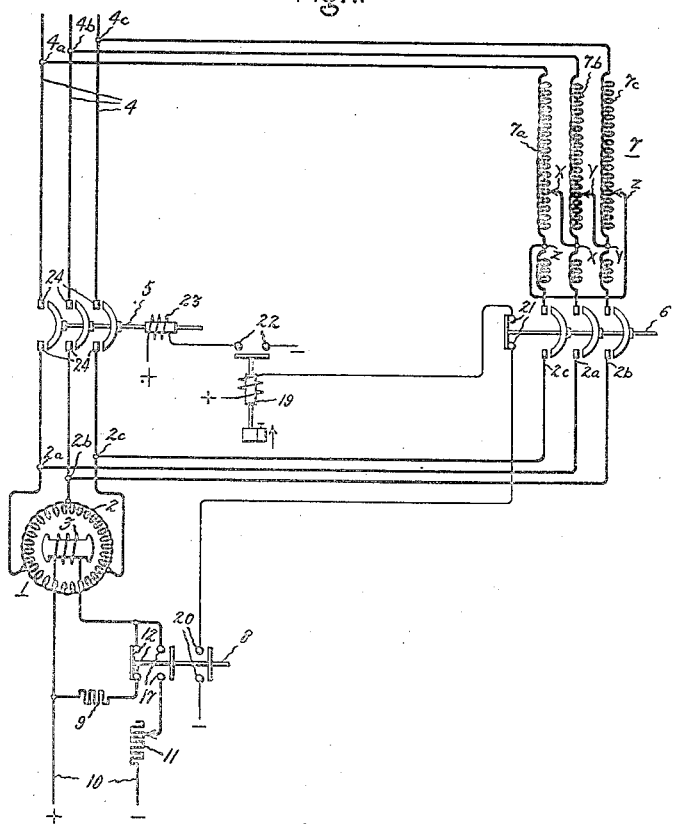
Figure 2:
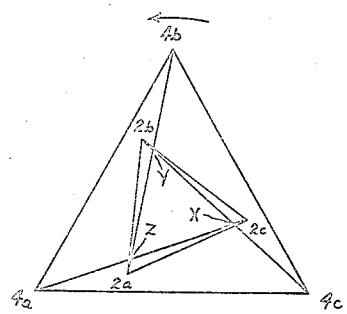

My invention will be better understood from the following description when taken in connection with the accompanying drawing, Fig. 1 of which diagrammatically illustrates a synchronous motor starting system embodying my invention and Fig. 2 of which is an explanatory vector diagram of the starting voltages applied to the motor primary winding in the particular embodiment of my invention shown in Fig. 1, and its scope will be pointed out in the appended claims.

Referring to Fig. 1 of the drawing, 1 represents a synchronous machine, such as a synchronous condenser or motor having a polyphase primary or armature winding 2 and a field winding 3. The primary winding 2, which is shown as a three-phase winding, has its three terminals 2a, 2b and 2c arranged to be connected directly to the conductors 4a, 4b and 4c, respectively, of a three-phase supply circuit 4 by suitable switching means 5. 6 represents a suitable switch for connecting the motor terminals 2a, 2b and 2c to the low voltage terminals of suitable voltage reducing means such as an auto-transformer 7 the windings of which are connected to the supply circuit 4 and to each other in any suitable manner so that the low secondary voltage thereof leads the voltage of the supply circuit 4 by a predetermined amount. 8 represents a two-position field switch which in one position connects, through its contacts 12, a discharge resistor 9 across the terminals of the field winding 3 and which in its other position connects, through its contacts 17, a source of excitation 10 and a suitable adjustable resistor 11 in series across the terminals of the field winding 3.

In accordance with my invention, overexcite the field winding 3 while the starting switch 6 is closed and, also, I interconnect the windings of the auto-transformer 7 in any suitable manner so that the low polyphase starting voltage impressed across the motor terminals 2a, 2b and 2c is advanced in phase a predetermined amount relative to the phase voltages between the conductors 4a, 4b and 4c of the supply circuit 4. Preferably the amount of overexcitation is so adjusted that, when the switch 6 is opened after the motor has been synchronized, the terminal voltage of the motor will build up quickly to its normal running value and the low polyphase starting voltage is advanced in phase angle by an amount equal to the angle by which the motor will fall back during the transfer from low voltage to full voltage primary connections when the transfer is prolonged just long enough to allow the motor terminal voltage to increase to its normal running value. In this manner the switch 5 is closed at an instant when the motor terminal voltage is substantially in phase and equal in magnitude with the supply circuit voltage so that no sudden rush of current occurs to produce undesirable disturbances in the supply circuit 4. For automatically effecting the closing of the switch 5 at the proper time after the switch 6 is opened, I have shown a time relay 19 the energizing circuit of which is completed through the series connected contacts 20 of the field switch 8 and contacts 21 of the switch 6. The relay 19 is adjusted so that its operating time is long enough so that it closes its contacts 22 in an energizing circuit for the closing coil 23 of the switch 5 to effect the closing of the switch 5 when motor terminal voltage is in phase and equal in magnitude with the voltage of the supply circuit 4.

In the particular embodiment shown in Fig. 1 for obtaining a low leading starting voltage, the auto-transformer 7 is provided with three windings 7a, 7b and 7c. One end of the winding 7a is connected to the conductor 4a of the supply circuit 4 and the other end of this winding is arranged to be connected by the switch 6 to the motor terminal 2c. Similarly, one end of the winding 7b is connected to the conductor 4b of the supply circuit 4 and the other end of this winding is arranged to be connected to the motor terminal 2a by the switch 6 and one end of the winding 7c is connected to the conductor 4c of the supply circuit 4 and the other end of the winding 7c is arranged to be connected to the motor terminal 2b by the switch 6. The three windings 7a, 7b and 7c are also interconnected at dissimilar points so that the corresponding respective intermediate portions XZ, YX and ZY are connected in delta. The voltages obtained by the connections of the windings 7a, 7b and 7c, shown in Fig. 1, will be seen more clearly from the vector diagram, shown in Fig. 2. In this Fig. 2, 4a, 4b and 4c represent the delta voltage between the conductors 4a, 4b and 4c. XYZ represents the delta voltage across the intermediate delta-connected portions of the windings 7a, 7b and 7c and the delta voltages 2a, 2b and 2c represent the voltages applied to the motor terminals 2a, 2b and 2c. From this Fig. 2, it will be seen that the phase of each secondary voltage of the auto-transformer 7 leads the corresponding phase voltage of the supply circuit 4 by a predetermined amount. It will be obvious that, by varying the intermediate connections of the windings 7a, 7b and 7c, the magnitude and phase angle of the voltage applied to the motor terminals by the voltage reducing means may be adjusted to any desired values.

The operation of the arrangement, shown in Fig. 1 of the drawing, is as follows:

When it is desired to start the motor 1, the starting switch 6 is closed while the field switch 8 is in the position shown in the drawing. The relatively low leading voltage impressed across the armature winding 2 by the autotransformer 7 causes the machine 1 to start from rest and accelerate to substantially synchronous speed as an induction motor. When the motor 1 reaches a speed near synchronous speed, the field switch 8 is operated in any suitable manner so that the source of excitation 10 and the adjustable rheostat 11 are connected in series with the field winding 3 to pull the motor 1 into synchronism. The rheostat 11 is adjusted so that the machine is overexcited a predetermined amount. Since the voltage impressed across the armature winding of the motor 1 leads the voltage of the supply circuit 4, the rotor of the motor 1, while it is operating in synchronism with the impressed low voltage, is also ahead of the position it would occupy if the motor were operating in synchronism, with its armature winding connected directly to the supply circuit 4 by the running switch 5.

When it is desired to establish the normal running primary connections of the motor after the motor has been synchronized, the switch 6 is first opened to disconnect the armature winding 2 from the secondary terminals of the auto transformer 7. By closing its contacts 21, the switch 6 completes an energizing circuit for the time relay 19 through contacts 20 of field switch 8. Due to the fact that the machine is overexcited, the terminal voltage of the machine starts to increase as soon as the switch 6 is opened and after a predetermined time the terminal voltage of the machine reaches a value equal to the supply circuit voltage 4. Also, as soon as the switch 6 is open, the rotor of the machine 1 starts to slow up so that the motor terminal voltage starts to fall back relative to the supply circuit voltage. After a predetermined time, equal to the sum of the delay of relay 19 and the closing time of switch 5, which is just long enough for the motor terminal voltage to equal the supply circuit voltage and for the motor terminal voltage to fall back so that it is in phase with the supply circuit voltage, the switch 5 closes its main contacts 24 and thus establishes the normal running connections of the motor.

While I have, in accordance with the Patent Statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. The method of varying the voltage applied to the armature winding of a synchronous machine which is operating in synchronism with a relatively low voltage source of alternating current, which consists in disconnecting the armature winding of the machine from said source while maintaining its field winding excited with direct current of such a magnitude as to cause the terminal voltage of the disconnected machine to build up to a predetermined relatively high voltage within a predetermined time interval, and then connecting at the expiration of said predetermined time interval the armature winding of said machine to a source of alternating current having a voltage substantially equal to said relatively high voltage and lagging the voltage of said relatively low voltage source an amount substantially equal to the phase variation of the armature terminal voltage of the disconnected machine occurring during said predetermined time interval.

2. In combination, a polyphase supply circuit, a synchronous machine, means including a transformer interconnecting said supply circuit and machine for applying to said machine a relatively low polyphase voltage advanced in phase relative to the voltage of said supply circuit, means for overexciting said machine while said low voltage is applied thereto, switching means for disconnecting said machine from said transformer, and means for connecting said machine directly to said circuit after said machine has been disconnected from said transformer for a sufficient length of time to allow the terminal voltage of said machine to build up to a value substantially equal in magnitude to the supply circuit voltage.

3. In combination, a polyphase supply circuit, a synchronous machine, means including a transformer interconnecting said supply circuit and machine for applying to said machine a relatively low polyphase voltage advanced in phase relative to the voltage of said supply circuit, means for overexciting said machine while said low voltage is applied thereto, switching means for disconnecting said machine from said transformer, and means for connecting said machine directly to said circuit after said machine has been disconnected from said transformer for a sufficient length of time to allow the terminal voltage of said machine to fall back in phase sufficiently to be in phase with the supply circuit voltage and to build up to a value substantially equal in magnitude to the supply circuit voltage.

4. The method of changing the voltage applied to a synchronous machine, which consists in operating the machine in synchronism with a relatively low voltage source of alternating current which leads the voltage of a relatively high voltage source of alternating current by a predetermined amount, then entirely disconnecting the machine from said relatively low voltage source while maintaining the field winding of the machine sufficiently energized so that the voltage of said machine builds up to a value substantially equal to the voltage of said relatively high voltage source by the time the rotor of the machine has changed its position sufficiently to bring the voltage of said machine substantially into phase with the voltage of said relatively high voltage source, and then connecting said machine to said relatively high voltage source when the voltages thereof are substantially equal and in phase.

HAROLD T. SEELEY.